Feb. 21, 1939.                J. E. STEVENS                 2,148,282
                         ROTARY COMPRESSOR-MOTOR
                         Filed Oct. 15, 1937           2 Sheets-Sheet 1
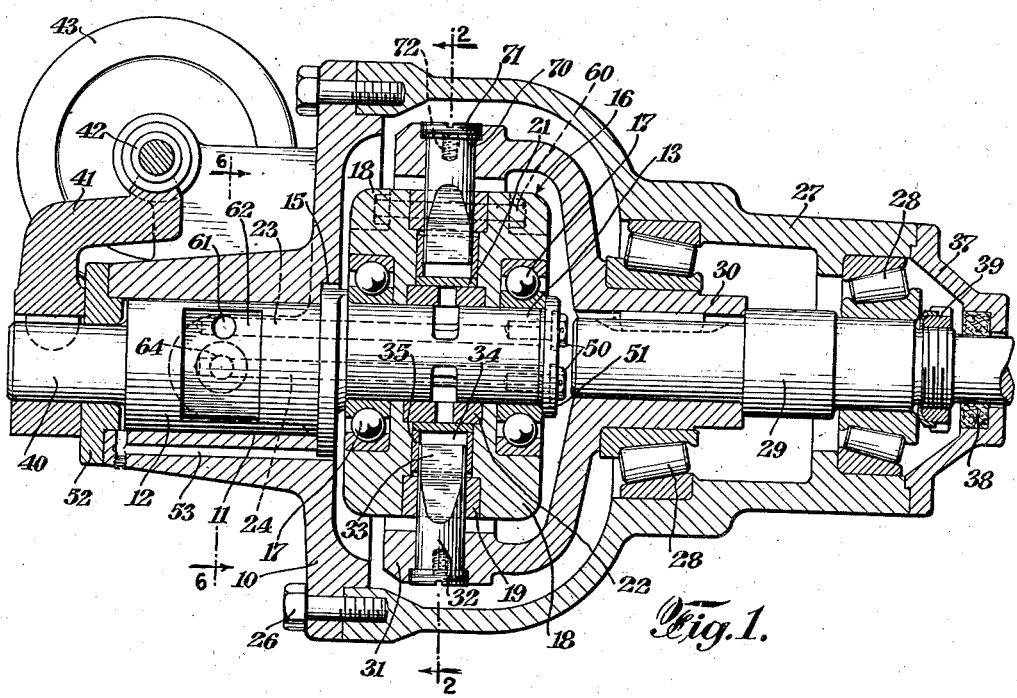
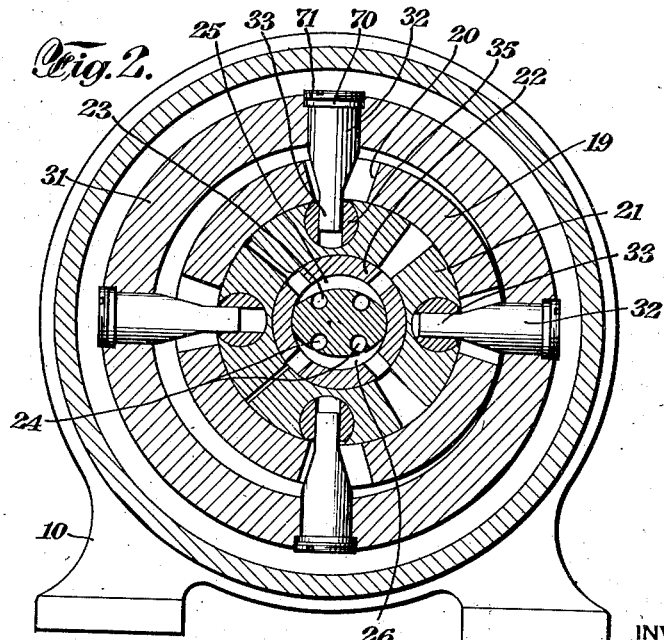
INVENTOR
John E. Stevens
BY Kenyon & Kenyon
ATTORNEYS

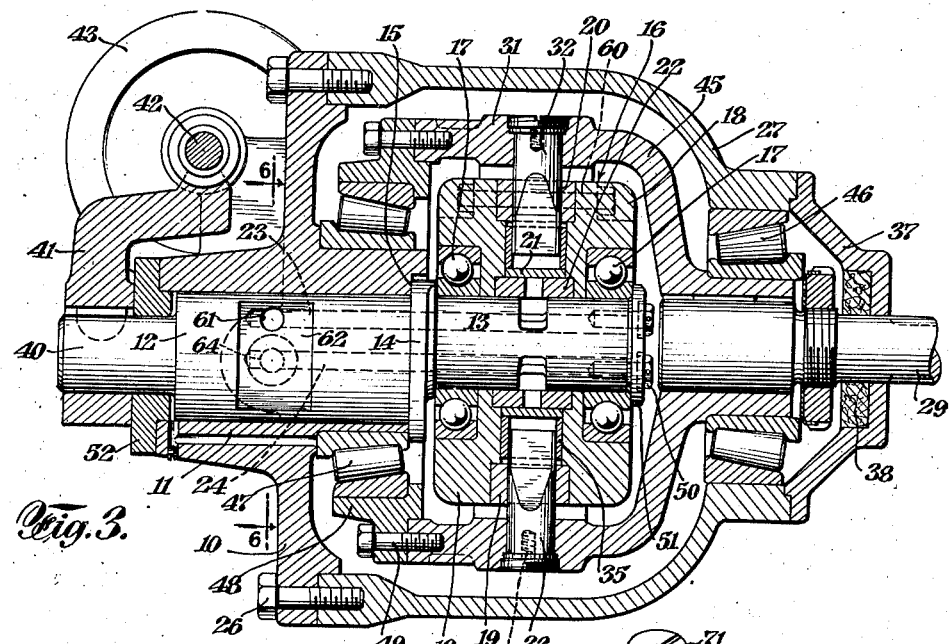
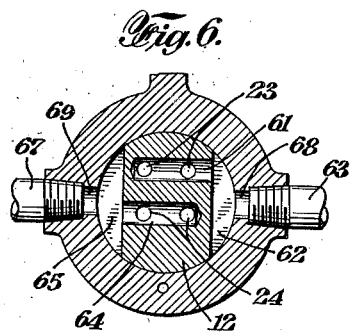
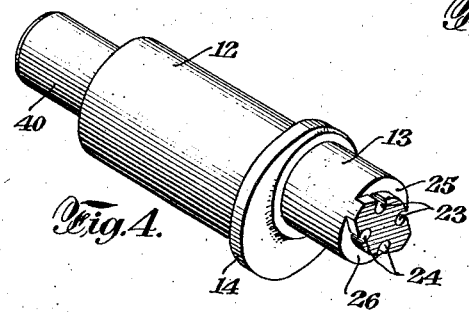
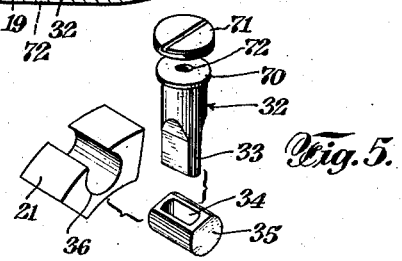
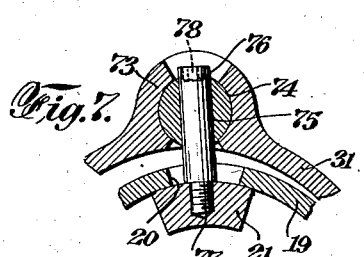

Patented Feb. 21, 1939

2,148,282

UNITED STATES PATENT OFFICE 2,148,282

ROTARY COMPRESSOR-MOTOR

John E. Stevens, New York, N. Y.

Application October 15, 1937, Serial No. 169,111

7 Claims. (Cl. 103—129)

This invention relates to rotary compressor-motor apparatus. By "compressor motor apparatus" it is to be understood that the apparatus is such that, when driven by mechanical means, it can operate as a fluid compressor and that, on the other hand, when fluid is introduced into the apparatus under pressure, the apparatus can serve as a motor. It is to be further understood, however, that features of this invention relate both to apparatus adapted to be used only as a compressor and to apparatus adapted to be used only as a motor.

The apparatus of this invention is primarily intended for use as a pump. While it can be built as a general service pump, it is especially suitable for application to machine tool drives, hydraulic press operation, marine steering gear, and for similar services where high speeds and pressures and/or variable displacement with a constant speed drive are particularly desirable.

It is a purpose of this invention to make apparatus of the character described which is of high efficiency and which at the same time is of extremely strong and simple construction. It is an advantage of the structure of this invention that the parts thereof may be readily machined with precision so that parts having the desired closeness of fit can be readily manufactured. It is a further purpose and advantage of this invention that the apparatus embodying the invention contains parts which are in balance and in operation produce an extremely slight amount of noise and vibration. It is a further purpose of this invention to afford compressor-motor apparatus which is adapted to be operated at high speeds and under high pressures.

Features of this invention relate to the mounting of a cylinder block having sector pistons rotatably mounted therein so that the cylinder block is likewise rotatable about an axle shaft and to means for communicating rotational movement of said sector pistons in said rotatable cylinder block to a rotatable shaft. Preferably the rotatable shaft has an end adjacent the end of the axle shaft, said rotatable shaft and axle shaft having parallel eccentric axes, and a yoke member being fixed to said shaft and operatively connected to said sector pistons by virtue of finger members affording telescopic interconnection therewith through the outside wall of said cylinder block.

Features of this invention also relate to the means used affording an inlet and outlet to spaces between the sector pistons.

Further features of this invention also relate to the mounting of the cylinder block and sector pistons on the axle shaft using bearings adapted to withstand the difference in pressure between the compression and suction sides of the pump with a minimum of friction and wear. Preferably roll type bearings are employed on both sides of the sector pistons and between the axle shaft and the cylinder block which carries the sector pistons.

Further features of this invention relate to the construction of the cylinder block with an outer wall having openings therein adapted to telescopically receive fingers extending between the sector pistons and the yoke mounted on the rotatable shaft and with a rotatable collar adjacent the axle shaft having openings that communicate with the spaces between the sector pistons.

Further purposes, features and advantages of this invention will be apparent in connection with the following description of certain illustrated embodiments of this invention which are shown in the accompanying drawings, wherein Figure 1 is a side sectional view of one form of apparatus embodying this invention;

Figure 2 is a sectional view of the apparatus shown in Figure 1 taken on the line 2—2 of Figure 1;

Figure 3 is a side sectional view of an alternate form of apparatus embodying this invention;

Figure 4 is a perspective view partly in section of the means for mounting the axle shaft in the apparatus;

Figure 5 is a detail perspective view with the parts separated, of one of the sector pistons, the bearing member thereof and the finger which is adapted for telescopic insertion in said bearing member;

Figure 6 is a sectional view of the apparatus shown in Fig. 1 taken on the line 6—6; and Figure 7 is an endwise sectional view of a portion of the cylinder block and yoke showing an alternate means for affording interconnection between the sector pistons in the cylinder block and the yoke.

Referring to the foregoing drawings, the apparatus shown in Figs. 1, 2, 4, 5 and 6 comprises a support member 10 having bearing part 11 in which is journalled a journal shaft 12. Attached to the end of journal shaft 12 is the axle shaft 13, the axis of the axle shaft being parallel to the axis of the journal shaft, but with the axis thereof maintained eccentrically with respect to the axis of the journal shaft. Between the journal shaft 12 and the axle shaft 13 is an enlargement 14 which fits within the recess 15 in the support member 10.

Rotatably mounted on the axle shaft 13 is a cylinder block which is indicated generally by the reference character 16. The cylinder block includes roll type bearings 17 which are interposed between the axle shaft and the casting members 18 of cylinder block. The roll type bearings are here shown as ball bearings but roller bearings may also be used. Between the casting members 18 and adjacent the outer wall thereof is a ring part 19 constituting part of the outer wall of the cylinder block and having openings 20 therein. The ring part 19 affords one of the surfaces which is adapted to confine liquid in spaces between the sector pistons 21 which are mounted for rotation within the cylinder block. However, since the cylinder block also rotates, the spaces between the sector pistons do not come into registry with the openings 20 in the ring part 19. The sector pistons are adapted for rotational movement between the casting members 18 and between the ring part 19 and the collar part 22. The collar part rotates with the cylinder block and is rotatably mounted with respect to the axle shaft 13. The collar part 22 has openings therein which are adapted to register with the spaces between the sector pistons as the cylinder block and sector pistons rotate. The castings 18, ring part 19 and collar part 22 may be maintained in assembled position by any suitable means such as bolts 60.

Within the axle shaft are passages adapted to act as inlet and outlet means. For example, the two passages 23 may be drilled through the axle shaft with continuations thereof extending into the journal shaft 12 and these passages may act as inlet passages. The two passages 24 are of a similar character and may act as outlet passages. Of course, the passages 23 and 24 may act either as inlet or outlet passages depending on the direction of rotation of the parts or the relative position of the parts of the apparatus. By appropriate openings in the journal shaft 12 which are in registration with openings in the bearing part 11 the inlet passages and outlet passages may communicate with suitable conduits adapted to supply fluid to the pump and discharge fluid under pressure from the pump. For example, as shown in Fig. 6, the passages 23 may open into cross passage 61 which in turn opens into channel 62 that registers with opening 68 in the bearing part 11, a conduit 63 being connected to said opening. Similarly the passages 24 may open into the cross passage 64 which in turn opens into channel 65 that registers with opening 69 in bearing part 11, a conduit 67 being connected to said opening. The channels 62 and 65 enable the journal shaft 12 to be rotated to a considerable extent while maintaining registration between said channels and the openings 68 and 69.

The passages 23 also open into the channel 25 cut into the periphery of the axle shaft 13. The passages 24 communicate with the channel 26 which is cut into the opposite side of the axle shaft 13. The channels 25 and 26 do not communicate with each other but are so positioned in the axle shaft and with reference to the collar 22 as to maintain the fluid in the inlet passages independent of fluid in the outlet passages. In this manner means are afforded for confining fluid in two independent portions, one portion being confined in passages 23, arcuate channel 25 and some of the spaces between the sector pistons, and another portion being confined in the passages 24, arcuate channel 26 and between other spaces between the sector pistons.

Attached to the end of axle shaft 13 as by bolts 50 is a plate 51 which is of larger diameter than the axle shaft so as to maintain the cylinder block in proper position on the axle shaft between said plate and the enlargement 14.

Attached to the support member 10, as by bolts 26, is a casing 27 in which is rotatably mounted the rotatable shaft 29, as by roll type bearings, e. g., the spaced roller bearings 28. One end of the rotatable shaft 29 is adjacent the end of the axle shaft 13, the axis of the shaft 29 being parallel with the axis of the axle shaft 13. Secured adjacent the end of the shaft 29 is the yoke 30 which is enlarged so as to include the ring member 31 which overlies the outer wall of the cylinder block 16. At intervals in the ring 31 are maintained fingers which are indicated generally by the reference character 32 and which pass through the openings 20 in the ring part 19 of the cylinder block. The fingers 32 have narrowed end portions 33 which are telescopically slidable in opening 34 in the bearing parts 35 which are carried in the recesses 36 in the sector pistons 21. The fingers 32 are maintained in position by the enlarged heads 70 and by the caps 71 which are adapted to be screwed into the openings in the ring member 31. To facilitate removal of a finger 32 after the screw cap 71 has been removed, the finger 32 may be provided with an internally-threaded recess 72 adapted to engage a threaded screw inserted therein which is of sufficient length to be gripped.

At the end of the casing 27 is a cap member 37 having a packing 38 therein about the shaft 29. In order to maintain the shaft 29 assembled within the casing 27, a nut 39 is used which is in threaded engagement with a portion of the shaft 29 and which may be tightened so as to maintain the parts in proper relative position.

In order to vary the position of the axis of the axle shaft 13 with reference to the axis of the rotatable shaft 29, the journal shaft 12 has a stud 40 extending therefrom and through the cap plate 52 carried by bearing part 11. An arm 41 is attached to the stud 40. The stud 40 and journal shaft 12 can be rotated by means of a worm gear 42 interposed between the hand wheel 43 and the end of the arm 41. The hand wheel is adapted to be rotated in fixed bearings so as to move the arm 41 and rotate the journal shaft 12. Since the axis of the axle shaft 13 is eccentric with respect to the axis of the journal shaft 12 rotation of the journal shaft 12 causes the axis of the axle shaft 13 to be moved relatively to the axis of the rotatable shaft 29. Preferably the parts are arranged so that axis of the axle shaft 13 may be moved a considerable distance on each side of a point at which the axis of the axle shaft 13 is in coaxial relation with the axis of the shaft 29. Preferably also the axis of the journal shaft 12 is in parallel eccentric relation with respect to the rotatable shaft 29. While the axle shaft 13 rotates when the journal shaft 12 is rotated, it is normally non-rotatable when the device is in operation.

In order to return any fluid escaping from the outer end of the bearing part 11, a drain line 53 may be provided. Moreover, while such escaping fluid will be in very small amount, any gradually collecting fluid in the casing 27 may be removed through a drain-off line (not shown), if so desired.

The operation of the device shown in Figs. 1, 2, 4, 5 and 6 is believed to be apparent. When the axis of the axle shaft 13 is in eccentric relation to the axis of the shaft 29, the space between any two of the sector pistons successively becomes greater or smaller upon rotation of the shaft 29, the sector pistons 21 and the cylinder block 16 relatively to the axle shaft 13. This mechanical motion is also referred to herein as one wherein the sector pistons successively move at varying speeds. During this motion of the sector pistons the fingers attached to the ring member 31 of the yoke 30 move in and out of the recesses in the sector pistons. While the sector pistons move at successively varying speeds, the cylinder block 16 and the rotatable shaft 29 rotate at a substantially constant speed. Assuming that the shaft 29 is being driven in a clockwise direction, it is believed to be apparent that the sector pistons in the upper half of their revolution (see Figure 2) will become increasingly spaced from each other. In the lower half of their revolution they progressively become closer to each other. In such case the passages 23 act as inlet passages for fluid, the fluid being drawn through the conduit means including the passages 23, the arcuate channel 25 and the openings in the collar 22, and into the spaces between the sector pistons which, as aforesaid, are progressively becoming larger. The passages 24 act as outlet passages, fluid being expelled from the spaces between the sector pistons as they progressively become smaller, through the conduit means including openings in the collar 22, the arcuate channel 26, and the passages 24. As hereinbefore stated, the arcuate channels 25 and 26 in the axle shaft are of such limited length that the fluid on the inlet side of the apparatus is kept separate from the fluid on the discharge side of the apparatus by the portion of the axle shaft between these arcuate channels. By rotating the shaft 29 from any suitable source of power not shown the device acts as a pump and is adapted to produce a continuous and non-pulsating flow of fluid, such as oil, into the device, into spaces between the sector pistons, and thence out of the device on the discharge side thereof.

The apparatus has its maximum capacity when the degree of eccentricity between the axis of the rotatable shaft 29 and the axis of the axle shaft 13 is at a maximum. When the axle shaft 13 is moved so that its axis becomes coaxial with the axis of shaft 29, then the apparatus is in idling position and no pumping effect is secured. By varying the degree of eccentricity between the axle shaft 13 and the rotatable shaft 29 the rate of pumping can be varied for a constant rate of revolution of the shaft 29. Moreover, if the axis of the axle shaft 13 is moved from one side of the axis of the shaft 29 to the other side of the axis of shaft 29, the direction of flow of fluid through the apparatus will be reversed while maintaining rotation of the shaft 29 in the same direction. Reversal of fluid through the apparatus can also be accomplished by continuing to maintain the axis of the axle shaft 13 on the same side of the axis of the shaft 29 and reversing the direction of rotation of the shaft 29. Moreover, the rate of pumping can, of course, be varied while maintaining constant the relative positions of the axis of axle shaft 13 and the axis of shaft 29 by varying the rate of revolution of the shaft 29.

While the apparatus may operate as a compressor, it also may be used as a motor. Thus, by forcing fluid under pressure through inlet passages 23, the pressure on the fluid tends to increase the spacing of the sector pistons in the upper half of the revolution thereof (see Figure 2) and causes the sector pistons and the yoke 30 to rotate in a clockwise direction and deliver power to shaft 29. In such case it is assumed that the pressure in the outlet passages 24 is lower than the pressure in the inlet passages 23 so as to maintain a pressure differential sufficient to cause the device to act as a motor.

The apparatus above described can also be used as a variable speed hydraulic transmission by using one device with a fixed center as a motor and another device with variable displacement means to provide the operating fluid under pressure.

In Figure 3 an alternate form of apparatus embodying this invention is shown. Most of the apparatus is similar to the apparatus shown in Figs. 1, 2, 4 and 5, and where the parts are similar, they have been indicated by similar reference characters in Figure 3 and the description thereof will not be repeated. In Figure 3 the shaft 29 is mounted for rotation with respect to the casing 27 in a manner which is somewhat different from that shown in Figs. 1 and 2. In Fig. 3 a yoke 45 is used which is mounted for rotation with respect to the casing 27 by means of bearings situated on both sides of the cylinder block. Thus a bearing such as the roller bearing 46 is used on one side of the cylinder block in order to mount the yoke 45 and the shaft 29 for rotation with respect to the casing 27. On the other side of the cylinder block are additional bearings such as the roller bearings 47 which are interposed between the support member 10 and a bearing support 48 which is attached to the yoke as by means of bolts 49. In this manner, any forces tending to throw the shaft 29 out of alignment are borne by the bearings on both sides of the cylinder block.

An alternate means for communicating rotary motion between the sector pistons and the yoke parts of the apparatus is shown in Fig. 7. As hereinabove described, the device includes sector pistons 21 and the ring part 19 of the cylinder block having openings 20 therein. The ring member 31 of the yoke includes bearing parts 73 (one of which is shown in Fig. 7) which slidably engage the bearing 74 for rotation therein. The bearing 74 is provided with hole 75 in which is slidably mounted the finger 76. In this modification the finger 76 is fixed to the sector piston 21 as by being screwed into the internally threaded socket 77 in the sector piston. Preferably bearing part 73 has an opening in the outer wall so as to permit the insertion of the finger 76. The finger 76 may be provided with any suitable means such as the polygonal recess 78 for turning the finger so that it may be conveniently placed in position or removed as desired.

It is to be understood that the structures above described are specific embodiments of this invention which are merely illustrative of this invention and that structures embodying this invention may take many different forms. Thus, while four sector pistons have been shown, it is apparent that a lesser or greater number of sector pistons may be employed. Likewise, the dimensions of the apparatus may be varied. In this connection, the capacity of an installation can be readily changed merely by employing sector pistons (and cooperating cylinder block parts and axle shaft) of different lengths and widths, as well as by increasing and diminishing the proportions of all of the parts of the apparatus. It is also to be understood that the various parts herein described can be made in single units or as a plurality of assembled separate members. The cylinder block, for example, may be made up in several ways, using a greater or less number of parts than the parts shown in the drawings. Moreover, other means than the means shown may be used for adjusting the degree of eccentricity between the axle shaft and the rotatable shaft of the apparatus. Moreover, other means may be used for transmitting rotary motion from the sector pistons to the yoke part of the apparatus. It is, therefore, to be understood that the embodiments shown herein are illustrative merely and that the scope of this invention is to be governed by the language of the following claims.

What I claim is:—

1. Apparatus of the character described which comprises a normally non-rotatable axle shaft, a cylinder block rotatably mounted on said axle shaft, a plurality of sector pistons rotatably mounted within said cylinder block about an axis concentric with the axis of said cylinder block, a rotatable shaft, the axis of which is parallel with the axis of said axle shaft, a yoke fixed to said rotatable shaft, which yoke has a part thereof adjacent the outer wall of said cylinder block remote from said axle shaft, said wall having openings therein, finger members extending through said openings and affording telescopic connection between said sector pistons and said yoke adapted to communicate rotary motion between said sector pistons and said yoke and means for maintaining the axis of said axle shaft in eccentric relation with respect to the axis of said rotatable shaft.

2. Apparatus of the character described which comprises a normally non-rotatable axle shaft, a cylinder block rotatably mounted on said axle shaft, sector pistons mounted for rotation within said cylinder block between a collar part of said cylinder block adjacent said axle shaft having openings therein adapted to register with spaces between said sector pistons and a ring part of said cylinder block adapted to form a closure for the spaces between the sector portions at the outer periphery thereof and having openings overlying a portion of the outer wall of said sector portions, a rotatably mounted yoke, and fingers affording a telescopic connection between said sector portions and said yoke adapted to communicate rotary motion between said yoke and said sector pistons, means for maintaining the axis of said axle shaft in eccentric relation with respect to the axis of said rotatable shaft, and conduit means including said openings in said collar part whereby fluid may be moved into and discharged from the apparatus by the movement of the sector pistons at successively varying speeds during rotation of said yoke, said cylinder block and said sector pistons.

3. Apparatus of the character described, which comprises a normally non-rotatable axle shaft, a cylinder block rotatably mounted on said axle shaft by virtue of bearings between the periphery of said axle shaft and said cylinder block, a plurality of sector pistons rotatably mounted within said cylinder block between a collar portion of said cylinder block adjacent said axle shaft having openings communicating with spaces between said sector pistons and a ring portion of said cylinder block adapted to overlie the spaces between said sector pistons and having openings therethrough overlying a portion of the outermost surface of said sector pistons, a rotatable shaft, the axis of which is parallel to the axis of said axle shaft, a yoke fixed to said shaft having fingers telescopically inserted in recesses in said sector pistons underlying said openings in said ring portion of said cylinder block, inlet passage means in said axle shaft communicating with openings in said collar in registration with some of the spaces between said sector pistons and outlet passage means independent of said inlet passage means in said axle shaft communicating with openings in said collar registering with other spaces between said sector pistons, and means for securing relative movement between said axle shaft and said rotatable shaft so as to adjust the degree of eccentricity between the axis of said axle shaft and the axis of said rotatable shaft.

4. Apparatus of the character described, which comprises a normally non-rotatable axle shaft, a cylinder block, a plurality of sector pistons rotatably mounted within said cylinder block, roll type bearings on each side of said sector pistons by which said cylinder block is rotatably mounted with respect to said axle shaft, a collar part of said cylinder block between said axle shaft and said sector pistons having openings therein registering with spaces between said sector pistons, a first channel means in said axle shaft communicating with said openings in said collar, a second channel means independent of said first channel means communicating with other of said openings in said collar part, a journal shaft fixed to said axle shaft with the axis of the axle shaft in eccentric relation with the journal shaft, means for rotatably mounting said journal shaft, means for rotating said journal shaft about a fixed axis, inlet passage means within said journal shaft and said axle shaft communicating with said first channel means, outlet passage means independent of said inlet passage means within said journal shaft and said axle shaft communicating with said second channel means, a rotatable shaft the axis of which is parallel to the axis of said axle shaft, and means for transmitting rotary motion of said rotatable shaft to said sector pistons, rotation of said journal shaft being adapted to move said axle shaft relative to said rotatable shaft to adjust the degree of eccentricity between the axes of said shafts.

5. Apparatus of the character described, which comprises a casing, a journal shaft, means for rotatably mounting said journal shaft about an axis fixed with respect to said casing, an axle shaft within said casing fixed to said journal shaft and having its axis in eccentric parallel relation to said axle shaft, a cylinder block rotatably mounted on said axle shaft, sector pistons rotatably mounted within said cylinder block, a rotatable shaft rotatably mounted with its axis in eccentric parallel relation to said journal shaft by virtue of spaced bearings interposed between said shaft and said casing on one side of said cylinder block, fluid confining means adapted to contain a first portion of fluid in some of the spaces between said sector pistons and in passage means in said axle shaft communicating with said spaces, and adapted to confine a second portion of fluid independently of said first portion of fluid in other spaces between said sector pistons and in other passage means in said axle shaft communicating with said other spaces, a yoke fixed to said shaft and extending so as to overlie the outer wall of said cylinder block, and fingers fixed to said yoke extending telescopically inwardly into recesses in said sector pistons and adapted to communicate rotary movement between said sector pistons and said yoke, rotation of said journal shaft being adapted to move said axle shaft relative to said rotatable shaft to adjust the degree of eccentricity between the axes of said last-named shafts.

6. Apparatus of the character described, which comprises a casing, a journal shaft, means for rotatably mounting said journal shaft about an axis fixed with respect to said casing, an axle shaft within said casing fixed to said journal shaft and having its axis in eccentric parallel relation to said journal shaft, a cylinder block rotatably mounted on said axle shaft, sector pistons rotatably mounted within said cylinder block, a rotatable shaft rotatably mounted with its axis in eccentric parallel relation to said journal shaft by one bearing on one side of said cylinder block and another bearing on the other side of said cylinder block, first passage means in said axle shaft communicating with some of the spaces between said sector pistons, second passage means in said axle shaft communicating with other spaces between said sector pistons, fluid confining means adapted to confine a first portion of fluid in some of the spaces between said sector pistons and in said first passage means and to confine a second portion of fluid independently of said first portion in other spaces between said sector portions and in said second passage means, a yoke fixed to said rotatable shaft and extending between and carried by said bearings so as to overlie the outer wall of said cylinder block, and fingers extending inwardly telescopically into recesses in said sector pistons adapted to communicate rotary motion between said yoke and said sector pistons, rotation of said journal shaft being adapted to move said axle shaft relative to said rotatable shaft to adjust the degree of eccentricity between the axes of said last-named shafts.

7. Apparatus of the character described, which comprises a normally non-rotatable axle shaft, a cylinder block rotatably mounted on said axle shaft, a plurality of sector pistons rotatably mounted within said cylinder block about an axis concentric with the axis of said cylinder block, a rotatable shaft having its axis parallel to the axis of said axle shaft, a yoke fixed to said rotatable shaft extending about the exterior of said cylinder block, said shaft and yoke being mounted for rotation by means of bearing means on both sides of said cylinder block, finger members attached to the portion of said yoke overlying the outer wall of said cylinder block and extending inwardly through openings in said outer wall of said cylinder block and into recesses in the sector pistons therein, and means for maintaining the axis of said axle shaft in eccentric relation with respect to the axis of said rotatable shaft.

JOHN E. STEVENS.